United States Patent [19]

Siewert

[11] Patent Number: 4,480,613
[45] Date of Patent: Nov. 6, 1984

[54] CATALYTIC LATE DIRECT INJECTION SPARK IGNITION ENGINE

[75] Inventor: Robert M. Siewert, Birmingham, Mich.

[73] Assignee: General Motors Corporation, Detroit, Mich.

[21] Appl. No.: 516,183

[22] Filed: Jul. 21, 1983

Related U.S. Application Data

[63] Continuation of Ser. No. 319,143, Nov. 9, 1981, abandoned.

[51] Int. Cl.³ .............................................. F02B 19/10
[52] U.S. Cl. .................................... 123/298; 123/279; 123/280
[58] Field of Search ..................... 123/143 B, 305, 279, 123/670, 669, 668, 280, 3, 268, 270, 271, 272, 298; 431/268, 328

[56] References Cited

U.S. PATENT DOCUMENTS

| Re. 30,426 | 11/1980 | Haslett | 123/143 B |
|---|---|---|---|
| 1,820,878 | 8/1931 | Wyckoff | 123/670 |
| 2,483,288 | 9/1949 | Malin | 123/298 |
| 2,768,615 | 10/1956 | Taylor et al. | 123/301 |
| 3,498,275 | 3/1970 | Hardenberg | 123/305 |
| 3,648,676 | 3/1972 | Lowman, Jr. | 123/670 |
| 4,019,473 | 4/1977 | Kamiya | 123/280 |
| 4,092,967 | 6/1978 | Haslett | 123/279 |
| 4,185,593 | 1/1980 | McClure | 123/3 |

FOREIGN PATENT DOCUMENTS

0202080  8/1923  Italy .................................... 123/670

OTHER PUBLICATIONS

SAE Paper 800050 "Performance and $NO_x$ Model of a Direct Injection Stratified Charge Engine", Hiraki and Rife, Feb. 25-29-, 1980 (FIG. 1).

"The Catalytic Engine" by R. H. Thring from *Platinum Metals Review*, Oct., 1980, pp. 126-133, Johnson Matthey & Co. Ltd., London, U.K.

*Primary Examiner*—Ira S. Lazarus
*Assistant Examiner*—R. S. Bailey
*Attorney, Agent, or Firm*—Robert J. Outland

[57] ABSTRACT

A late injection direct injection stratified charge spark ignition engine is provided with a catalytic grid disposed in the path of injected fuel spray and downstream of the point of spark ignition to assist the completion of combustion of previously ignited fuel spray as well as to ignite and cause the combustion of previously unignited fuel elements passing therethrough. Improved combustion and reduced hydrocarbons emissions are anticipated.

8 Claims, 3 Drawing Figures

CATALYTIC LATE DIRECT INJECTION SPARK IGNITION ENGINE

CROSS REFERENCE This application is a continuation of copending U.S. patent application Ser. No. 319,143, filed Nov. 9, 1981 and now abandoned.

TECHNICAL FIELD

This invention relates to internal combustion engines and more particularly to spark ignition engines having direct cylinder fuel injection near the end of the compression stroke wherein catalytic means are used to assist combustion.

BACKGROUND

It has been recognized in the art that the potential fuel efficiency of an internal combustion engine is highest when the engine is operated unthrottled with a compression ratio in the neighborhood of about 12 to 1. However neither the conventional throttled spark ignition engine which requires a lower compression ratio N or the conventional forms of diesel compression ignition engines which require a higher compression ratio are capable of satisfactory operation in the desired range.

The direct injection stratified charge engine of the late injection type can be operated in the desired compression ratio range with an unthrottled air intake and has a further advantage of relatively broad tolerance to fuel type. However, when operating with an unthrottled air intake at part load, the lean mixtures in portions of the combustion chamber distant from the spark cause the flame to be extinguished before the completion of combustion and thus result in relatively high emissions of unburned hydrocarbons. Use of conventional techniques, such as intake throttling and exhaust gas recirculation, to control hydrocarbon and oxides of nitrogen emissions reduces the desired fuel efficiency of the engine.

To overcome these problems, it has been proposed[*] to utilize in the combustion chamber of a late direct injection stratified charge engine one or more catalytic grids to initiate combustion of the mixture of injected fuel and air and to promote relatively complete combustion of the fuel without the need for intake throttling. However tests of such an arrangement reportedly met with only limited success due to inadequate performance that was attributed to insufficient charge motion within the combustion chamber. Further work has since been conducted utilizing a modified form of indirect injection diesel engine with reduced compression ratio and a catalytic grid in the precombustion chamber with some improvement in results.

[*] "The Catalytic Engine" by R. H. Thring, Platinum Metals Review, October, 1980 pgs. 126–133, Johnson Matthey & Co. Limited, Hatton Garden, London, England.

SUMMARY OF THE INVENTION

The present invention proposes an improvement upon the prior concepts by combining features of the late direct injection stratified charge spark ignition engine with concepts proposed for prior experimental catalytic engines to provide an engine capable of both improved performance and satisfactory emission control. The resulting engine, which may be called a catalytic late direct injection spark ignition engine utilizes a stratified charge of fuel injected into a cylinder charge of swirling compressed air near the end of the compression stroke. The injected fuel is finely atomized for nearly immediate mixing with entrained air in the chamber to form a rich charge that is ignited by a spark plug immediately upon injection. A catalytic grid device is provided in the combustion chamber in the path of the fuel spray but downstream from the point of spark ignition so as to require substantially all of the injected fuel spray and its entrained air to pass through the grid after the main body of fuel has been ignited. The catalytic grid serves the purpose of promoting more complete combustion of the burning mixture and of igniting and completely burning portions of the fuel which reach the grid in the unburned state.

It is contemplated that the grid arrangement may be mounted directly on the cylinder head or an associated component thereof. If desired, it may be mounted upon the spark plug body to permit removal and inspection or replacement of the grid upon removal of the spark plug. Through proper arrangement of the components, it is contemplated that the catalytic late direct injection spark ignition engine can provide improved fuel efficiency and satisfactory emission control when operated over an extended load range in the unthrottled condition.

These and other features and advantages of the invention will appear more fully from the following description of certain preferred embodiments taken together with the accompanying drawing.

BRIEF DRAWING DESCRIPTION

DETAILED DESCRIPTION

Figure 1:
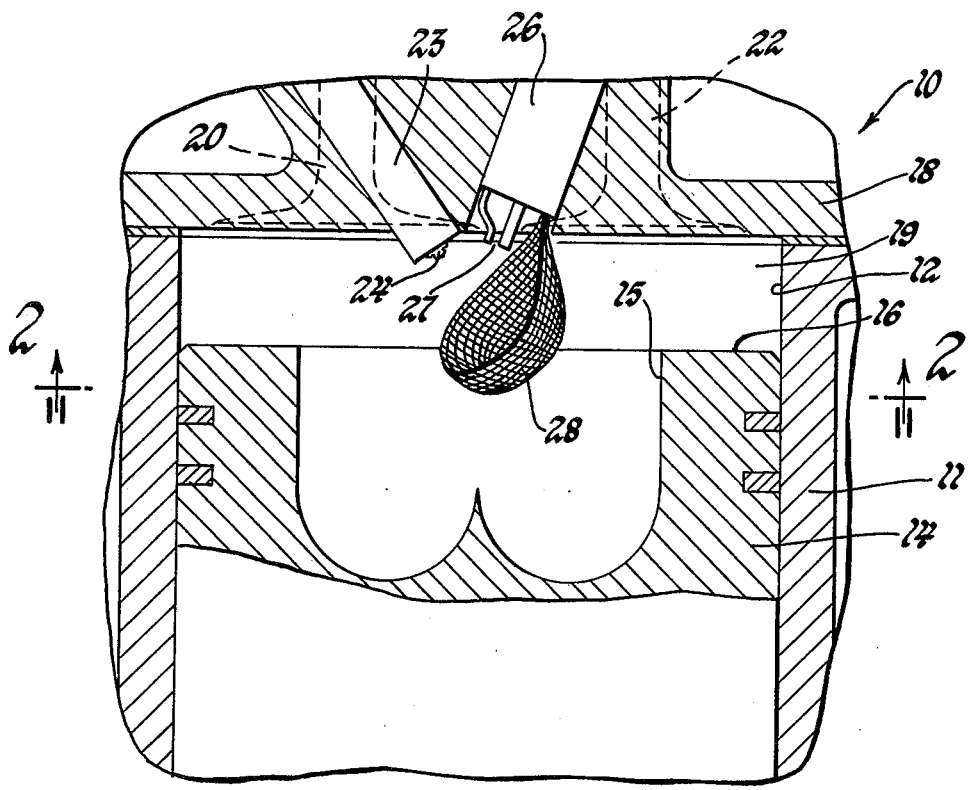
FIG. 1 is a fragmentary cross-sectional view showing the combustion chamber defining portions of a piston type internal combustion engine formed according to the invention.
Figure 2:
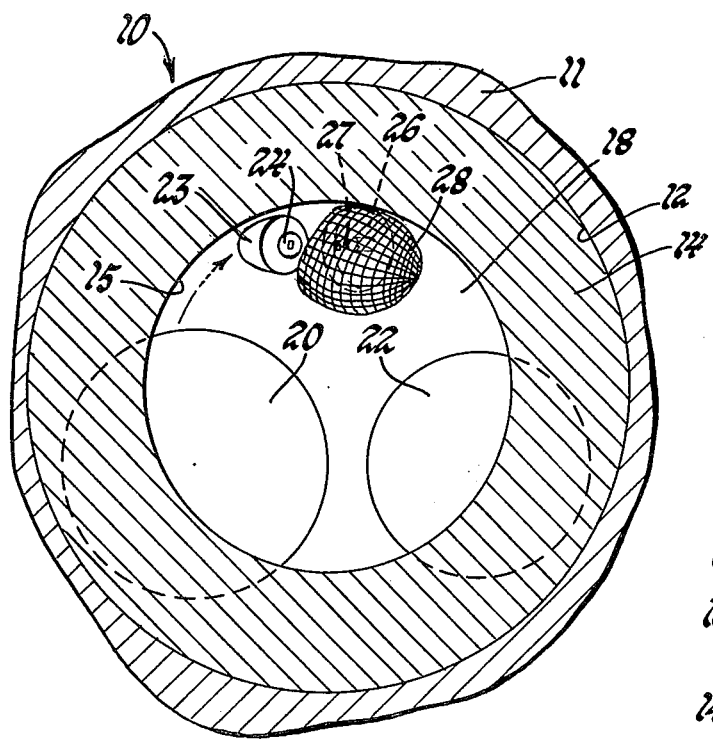
FIG. 2 is a transverse cross-sectional view from the plane indicated by the line 2-2 of FIG. 1.

Referring first to the embodiment of FIGS. 1 and 2 of the drawing, numeral 10 generally indicates a catalytic late direct injection spark ignition engine formed in accordance with the invention. Engine 10 includes a cylinder block 11 having a plurality of cylinders 12 only one of which is shown. Each of the cylinders carries a piston 14 mounted for reciprocation in the cylinder and having a combustion chamber recess 15 in the upper end 16 of the piston.

A cylinder head 18 closes the upper end of the cylinder 12 and defines therewith and with the upper end of the piston an enclosed variable volume combustion chamber 19. Inlet and exhaust valves 20 and 22 respectively control ports, not shown, for admitting a swirling charge of induction air to the cylinder on the piston intake stroke and exhausting burned gases from the combustion chamber on the piston exhaust stroke.

Engine 10 further includes fuel injection means in the form of a high pressure cylinder fuel injection system. The injection system includes an injection nozzle 23 mounted in the cylinder head and having a spray tip 24, extending into combustion chamber 19, through which charges a finely atomized high pressure fuel spray are injected into the combustion chamber. An ignition system is also provided that includes a spark plug 26 for each cylinder mounted in the cylinder head and having a spark gap 27 located within the combustion chamber in the path of the fuel spray.

The engine also provides in each combustion chamber a catalytic grid 28 which may be in the form of a stainless steel wire mesh or screen coated with a suitable catalyst, such as platinum. Other forms of screens and other catalysts may be utilized within the scope of the invention. The catalytic grid 28 is fixedly attached to a suitable portion of the cylinder head. In the disclosed embodiment, it is shown welded to the body of the spark plug 26 and extending into the combustion chamber to be received within the piston recess 15 as the piston moves upwardly to its top dead center position toward the end of the compression stroke.

The relationship of the described components is as follows. The inlet port, not shown, controlled by the poppet valve 20 directs the flow of inlet air into the cylinder, preferably in a manner to form a swirling air charge moving in a clockwise direction when viewed from the bottom as shown by the arrow in FIG. 2. The injection nozzle spray tip is offset from the cylinder axis and lies adjacent to the inlet valve on the downstream side in the direction of inlet air swirl. The nozzle is canted so as to direct the spray of atomized fuel into the combustion chamber downwardly but generally in the direction of swirling air flow. The spark plug spark gap is located adjacent the injection nozzle spray tip in the path of fuel spray and is circumferentially (angularly) offset from the spray tip in the direction of cylinder air swirl. Finally, the catalytic grid is located in the path of the fuel spray adjacent to and downstream from the location of the spark gap. The grid is shaped and positioned so that substantially all of the injected fuel spray and the air entrained therewith is required to pass through the grid.

In operation, the downward intake stroke of the piston causes the admission, through the intake port past the then opened intake valve, of a swirling charge of intake air into the combustion chamber. This charge is compressed as the piston moves upward on its compression stroke, near the end of which the injection of a fuel charge through the injection nozzle begins. The fuel is admitted in a finely atomized spray which immediately entrains and mixes with air from the swirling charge passing the injection nozzle spray tip.

Immediately after the beginning of injection, the spark plug ignites the air-fuel charge and the burning mixture of fuel spray and air is passed through the catalytic grid. Here, contact with the catalyst promotes complete combustion of the burning mixture and ignites those portions of the fuel spray which may not have been ignited by the flame front passing through the mixture from the point of spark ignition. The result is a prompt and positive ignition and burning of the air-fuel mixture with completion of combustion assisted by the action of the catalytic grid to provide the advantages of good fuel economy together with improved emission control over the generally available from direct injection stratified charge engines operated without substantial inlet throttling.

Figure 3:
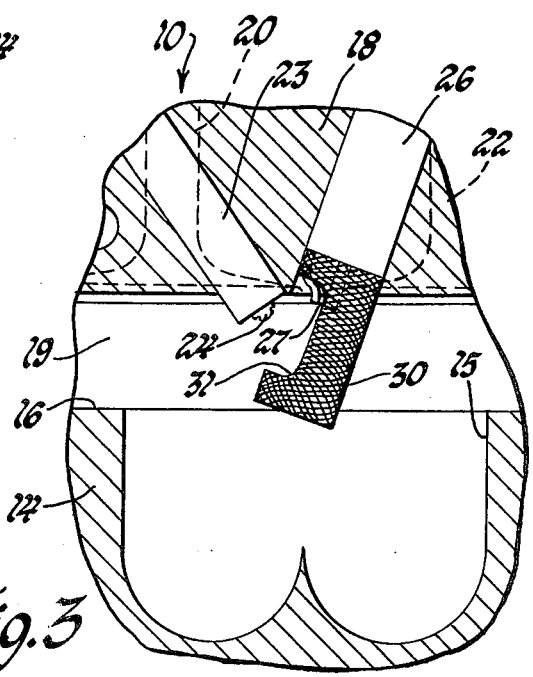
FIG. 3 is a fragmentary cross-sectional view similar to FIG. 1 but showing an alternative embodiment of engine according to the invention.

FIG. 3 illustrates an alternative embodiment of engine in accordance with the invention which, in the form illustrated, is identical to the construction of the embodiment of FIGS. 1 and 2 with the exception of the catalytic grid 30. for convenience, like numerals identify like parts. The grid is formed in a cup-like cylindrical configuration having an opening 31 in the side into which the fuel spray is directed. The cylindrical grid is formed with an outer diameter about the size of the end of the spark plug and is secured to the spark plug body as an extension thereof. Thus, upon removal of the spark plug, the grid is also removed for inspection and possible replacement.

While the invention has been described by reference to certain embodiments chosen for purposes of illustration, it should be understood that numerous changes could be made in the construction of the disclosed embodiments without departing from the scope or spirit of the inventive concepts described. Accordingly, it is intended that the invention not be limited to the described embodiments but that it have the full scope permitted by the language of the following claims.

The embodiments of the invention in which an exclusive property or privilege is claimed are defined as follows:

1. A catalytic late direct injection spark ignition internal combustion engine comprising
    a closed-end cylinder having a piston reciprocably movable therein and defining at the cylinder closed end a variable volume combustion chamber,
    intake means for the cylinder and operative to introduce fuel-free charging air into the combustion chamber,
    fuel injection means in the cylinder and operative to direct an atomized fuel spray comprising the sole cylinder fuel charge into the air mass in the combustion chamber in a path to entrain and mix with the air during injection periods beginning near the end of each piston compression stroke,
    spark ignition means in the cylinder in the path of the fuel spray and operative to cause a fuel igniting spark in the combustion chamber near the beginning of each injection period to ignite the passing mixture of injected fuel and entrained air and cause its continuing combustion during the injection period, and
    catalytic grid means downstream in the path of the fuel spray from the point of spark ignition, said grid means being located so as to require most of the injected fuel spray and its entrained air to pass directly through the grid in the path of the fuel spray to thereby assist in completing the ignition and combustion of the fuel spray.

2. An engine as defined in claim 1 wherein said catalytic grid means is mounted in a position fixed with respect to the cylinder closed end.

3. An engine as defined in claim 2 wherein the spark ignition means comprises a spark plug secured in a spark plug opening of the cylinder and the catalytic grid means is secured to the spark plug and is shaped to be capable of passing through the spark plug opening for removal from the engine with the spark plug.

4. An engine as defined in claim 1 wherein said catalytic grid means comprises a platinum coated stainless steel mesh.

5. A catalytic late direct injection spark ignition internal combustion engine comprising
    a closed-end cylinder having a piston reciprocably movable therein and defining at the cylinder closed end a variable volume combustion chamber,
    intake means for the cylinder and operative to introduce fuel-free charging air into the combustion chamber in a manner to provide a swirling air motion about the cylinder axis upon the completion of each piston compression stroke, fuel injection means carried by the cylinder and operative to direct an atomized fuel spray comprising the sole cylinder fuel charge into the swirling air mass in the combustion chamber in a path to entrain and mix with the air during injection periods beginning near the end of each piston compression stroke, spark ignition means carried by the cylinder in the path of the fuel spray and operative to cause a fuel igniting spark in the combustion chamber near the beginning of each injection period to ignite the passing mixture of injected fuel and entrained air and cause its continuing combustion during the injection period, and catalytic grid means dowstream in the path of the fuel spray from the point of spark ignition, said grid means being located so as to require substantially all the injected fuel spray and its entrained air to pass directly through the grid in the path of the fuel spray to thereby assist in completing the ignition and combustion of the fuel spray.

6. An engine as defined in claim 5 wherein said catalytic grid means is mounted in a position fixed with respect to the cylinder closed end.

7. An engine as defined in claim 6 wherein the spark ignition means comprises a spark plug secured in a spark plug opening of the cylinder and the catalytic grid means is secured to the spark plug and is shaped to be capable of passing through the spark plug opening for removal from the engine with the spark plug.

8. An engine as defined in claim 5 wherein said catalytic grid means comprises a platinum coated stainless steel mesh.

* * * * *